United States Patent
Alabassy et al.

(10) Patent No.: US 12,388,354 B2
(45) Date of Patent: Aug. 12, 2025

(54) FAULT TOLERANT CONVERTER TOPOLOGY

(71) Applicant: Goodrich Actuation Systems Limited, Solihull (GB)

(72) Inventors: Mohamed Elsayed Rashed Mohamed Alabassy, Nottingham (GB); Maamar Benarous, Coventry (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 140 days.

(21) Appl. No.: 17/957,083

(22) Filed: Sep. 30, 2022

(65) Prior Publication Data

US 2023/0095327 A1    Mar. 30, 2023

(30) Foreign Application Priority Data

Sep. 30, 2021    (EP) .................................... 21275139

(51) Int. Cl.
*H02M 1/32*    (2007.01)
*H02M 7/483*    (2007.01)

(52) U.S. Cl.
CPC .......... *H02M 1/325* (2021.05); *H02M 7/4835* (2021.05)

(58) Field of Classification Search
CPC .............................. H02M 1/325; H02M 7/4835
USPC ..................................................... 318/400.21
See application file for complete search history.

(56) References Cited

U.S. PATENT DOCUMENTS

| 9,065,366 | B2 | 6/2015 | Niemann et al. |
| 9,154,051 | B2 | 10/2015 | Raichle et al. |
| 2017/0047728 | A1 | 2/2017 | Benarous et al. |
| 2018/0337590 | A1 | 11/2018 | He et al. |
| 2019/0199086 | A1* | 6/2019 | Li ........................... H02H 7/08 |

FOREIGN PATENT DOCUMENTS

EP    3772817 A1    2/2021

OTHER PUBLICATIONS

Sun et al. (Modular Full-Bridge Converter for Three-Phase Switched Reluctance Motors With Integrated Fault-Tolerance Capability, Jun. 12, 2018). (Year: 2018).*
Matsuse et al. (Characteristics of phase shift control of PWM controlled thyristor rectifier in current source GTO inverter system for induction motor drive). Date of Conference: Oct. 7-12, 1990; Date Added to IEEE Xplore: Aug. 6, 2002; Print ISBN:0-87942-553-9 (Year: 1990).*
Wheeler (CN 86107650 A) Variable Frequency, Variable Voltage AC Motor Driving Device Date Published May 2, 1987 (Year: 1987).*

(Continued)

*Primary Examiner* — Jorge L Carrasquillo
(74) *Attorney, Agent, or Firm* — CANTOR COLBURN LLP

(57) ABSTRACT

A power inverter topology for converting a DC input to one or more phases of AC output, and methods for operating the same. The power inverter includes a switching circuit, an input circuit and a freewheeling diode bridge arrangement. The switching circuit comprises switch arms extending between the upper and lower branches of the switching circuit. The input circuit includes upper and lower isolating switches that can be selectively operated to respectively isolate the upper and/or lower branches of the switching circuit.

11 Claims, 13 Drawing Sheets

(56) References Cited

OTHER PUBLICATIONS

European Search Report for Application No. 21275139.0, mailed Mar. 24, 2022, 32 pages.
Matsuse, K., et al. "Characteristics of phase shift control of PWM controlled thyristor rectifier in current source GTO Inverter system for induction motor drive", Conference Record of the Industry Applications Society Annual Meeting. Seattle, Oct. 7-12, 1990; New York, IEEE, US Oct. 7, 1990, pp. 676-684, vol. 1.
Sun Qingguo et al: "Modular Full-Bridge Converter for Three-Phase Switched Reluctance Motors with Integrated Fault-Tolerance Capability", IEEE Transactions on Power Electronics, Institute of Electrical and Electronics Engineers, USA, vol. 34, No. 3, Jun. 12, 2018, pp. 2622-2634.

* cited by examiner

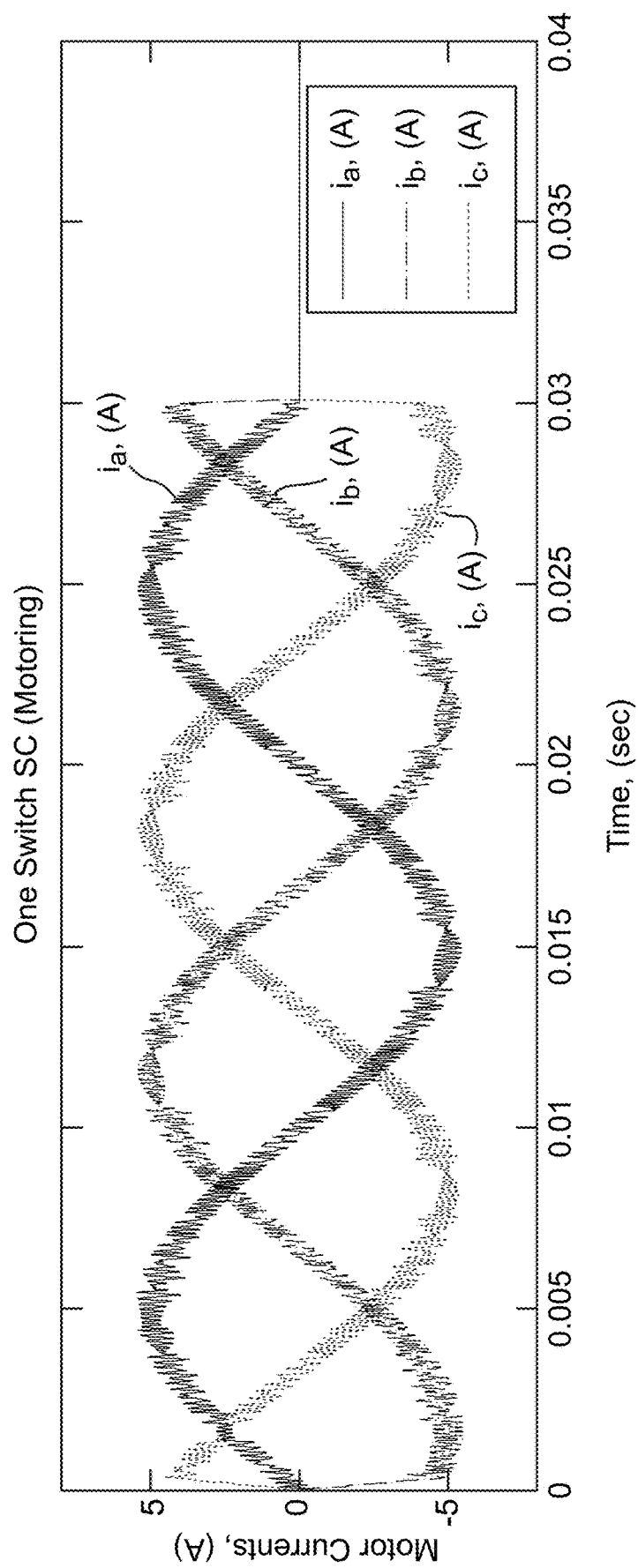

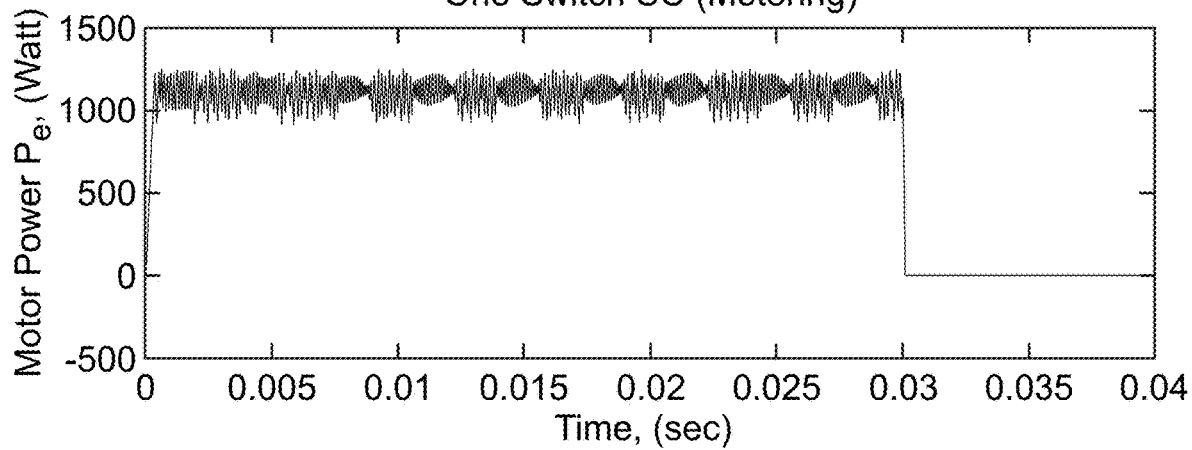
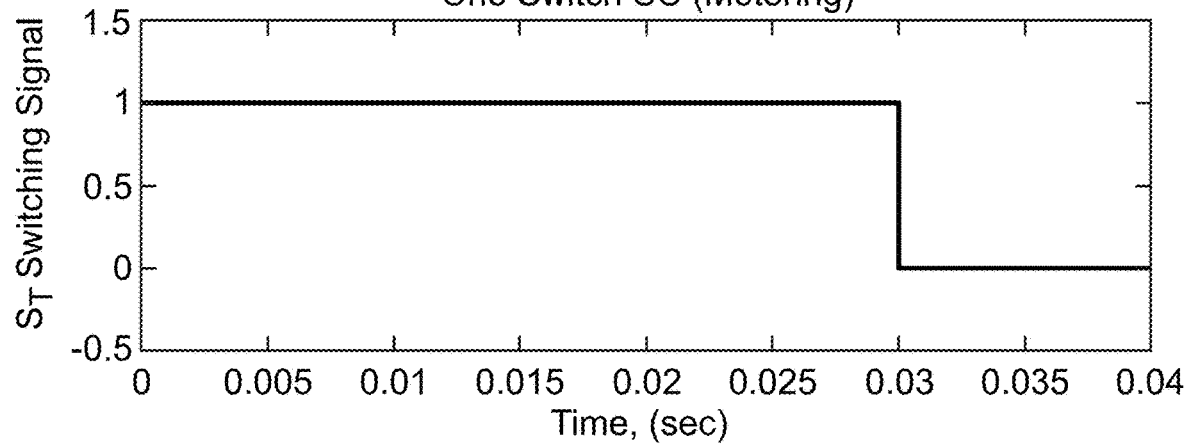

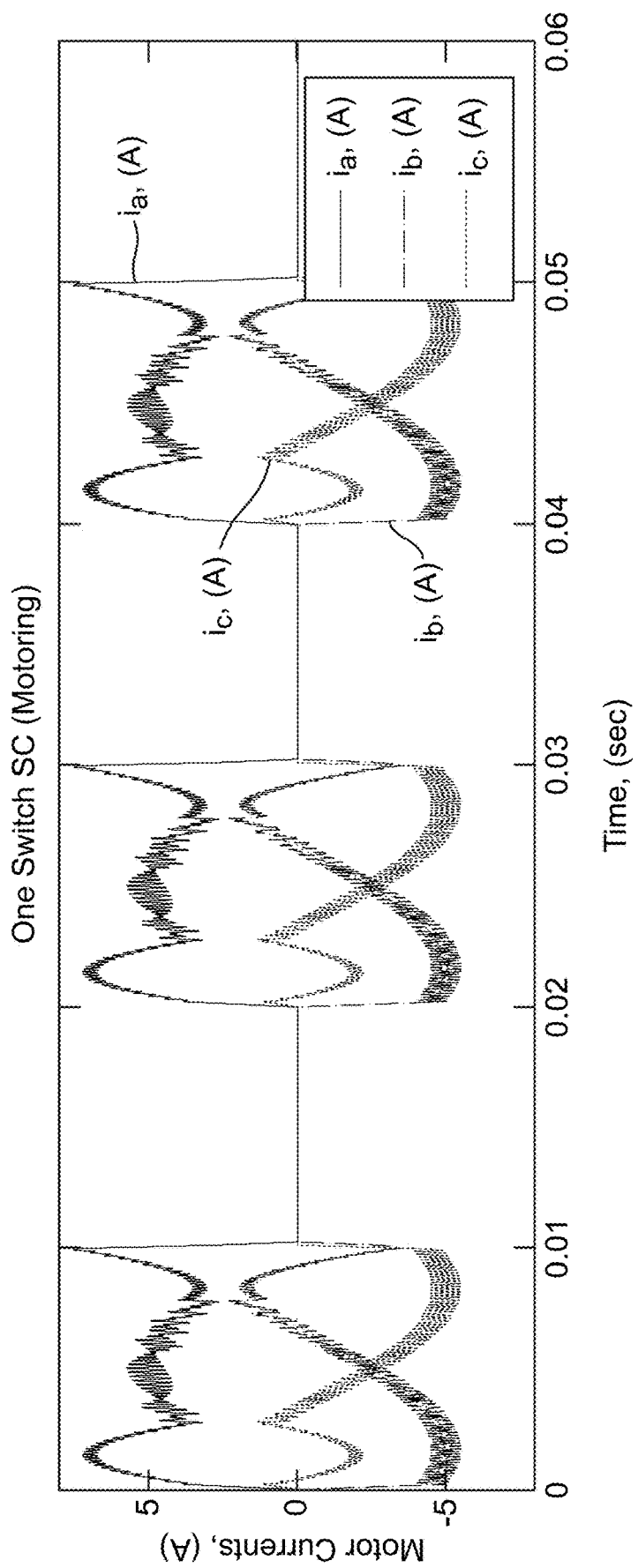

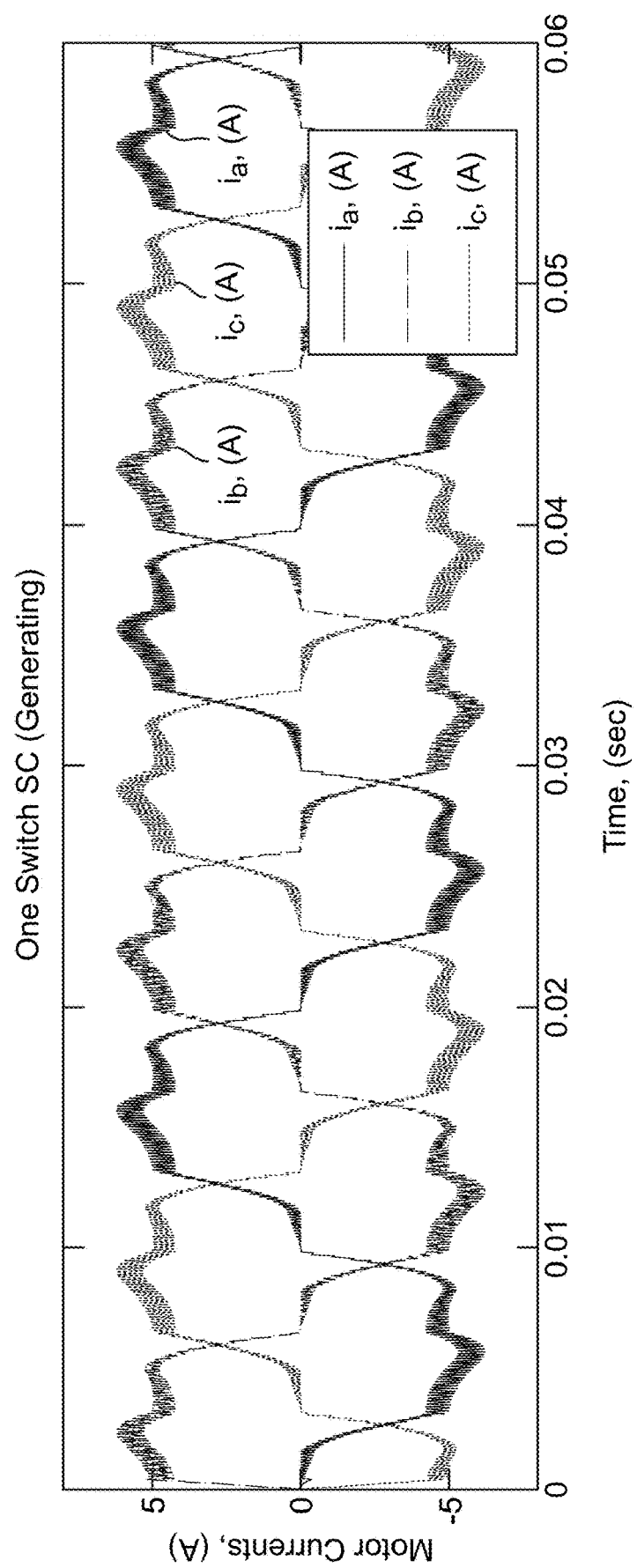

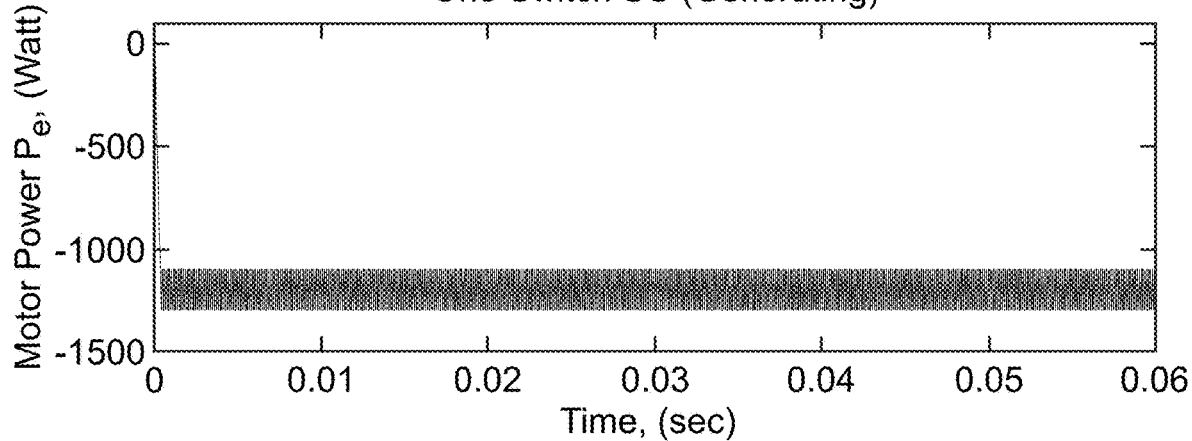
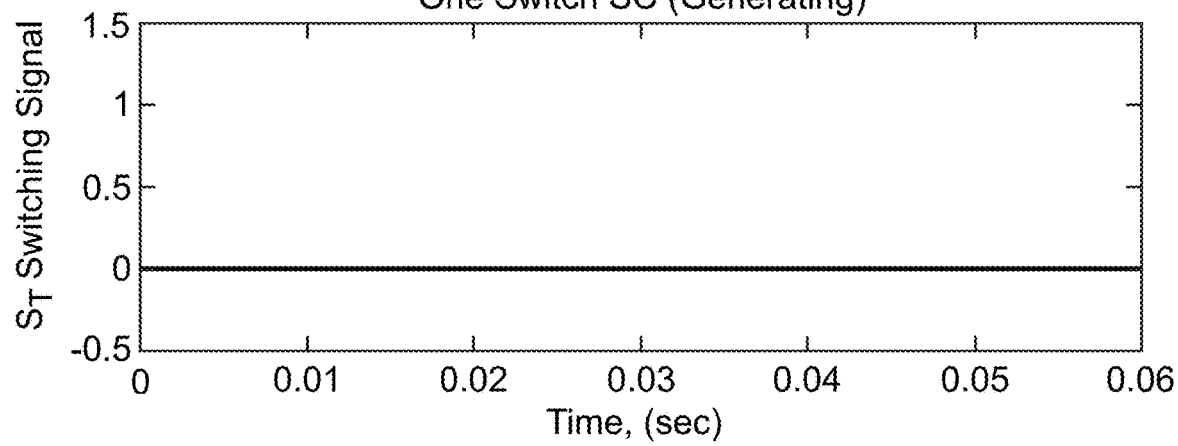

FAULT TOLERANT CONVERTER TOPOLOGY

CROSS-REFERENCE TO RELATED APPLICATIONS

This application claims priority to European Patent Application No. 21275139.0 filed Sep. 30, 2021, the entire contents of which is incorporated herein by reference.

TECHNICAL FIELD

The technology described herein relates to management of short circuit faults within inverter circuits, and in particular to providing a one switch short circuit (OSSC) fault tolerant inverter circuit topology that is therefore suitable for use in safety critical applications such as within motor drive systems for aerospace applications.

BACKGROUND

In aircraft, there is currently a trend towards so-called More Electric Aircraft (MEA) whereby loads such as flight control surfaces, landing gear, actuators, fans, pumps etc. which have traditionally been controlled by hydraulic and mechanical systems are now being designed to be controlled electrically by means of an electric motor. For example, Next Generation High Lift Systems (HLS) are envisaged to be highly flexible, distributed and actively controlled using Electro Mechanical Actuators (EMAs) that are driven by an electric motor drive system.

Typical motor drive systems consist of a simple motor driven by an inverter. Safety critical aerospace applications require a certain number of redundancies designed into the system architecture and this cannot be achieved using a simplex motor drive architecture. These redundancies have thus been provided by multi-channel motor drive designs as shown, for example, in FIG. 1. FIG. 1 shows a dual channel (duplex) three phase motor drive system. Thus, in the duplex permanent magnet motor configuration shown in FIG. 1, there are two segregated windings (such that each winding is driven by a separate inverter). When one of the two inverter of these systems develops a fault, the other inverter can take over and control the motor torque. Other numbers of multiple channels can of course also be used for increased redundancy.

To reduce weight and size, permanent magnet motors are often used since they typically have a higher torque/power density ratio in comparison to other motor drive alternatives such as switched reluctance or induction motors. An issue with a permanent magnet motor however is that the magnets cannot be switched off under failure of either the motor or the drive. One of the most severe failures is motor winding, or inverter switch shorting, such as a One Switch Short Circuit (OSSC) fault, wherein the inverter loses control over the motor current. Referring to the known inverter topology shown in FIG. 2, the OSSC fault provides natural short circuit paths to the motor currents via the freewheeling diode associated with the short circuited switch. This fault situation is illustrated in FIG. 3. The uncontrolled motor current waveforms under the OSSC fault may produce unacceptably high torque ripples, drag torque and power losses.

One way to manage an OSSC fault is by applying a three phase short circuit to the motor terminals, for example as described in United States Patent Application Publication No. 2017/0047728. The short circuit may be applied by switching on either the top or bottom three switches of the converter, such that the three phase short circuit produces a balanced short circuit motor current and ripples-free drag torque. The magnitude of the drag torque therefore decreases with the increase in motor speed.

However, the Applicants have recognised that existing the OSSC fault management strategies such as that proposed by United States Patent Application Publication No. 2017/0047728 may in some circumstances not be fully effective.

For instance, whilst the technique proposed in United States Patent Application Publication No. 2017/0047728 has certain advantages, the short circuit applied to the three phase windings may create additional drag torque for the healthy channel to overcome in addition to the load torque, which means that the converter and the motor are typically oversized for driving the load torque and the drag torque, especially at the starting mode of the motor. On the other hand, if the motor winding were designed to limit the short circuit current, this may result in increased motor copper losses.

The Applicants have therefore recognised that there is a need for improvements in the handling of such OSSC faults within inverter systems.

SUMMARY

The technology disclosed herein provides a novel inverter topology that is tolerant of short circuit faults such as OSSC faults. The inverter topology can thus be used to provide OSSC fault tolerant permanent magnet motor drive systems, for example.

A power inverter according to the present disclosure thus comprises a switching circuit, an input circuit and a freewheeling diode bridge arrangement. The switching circuit comprises an upper branch, a lower branch, and a respective switch arm for each phase of the output. Each switch arm extends between the upper and lower branches, and comprises an upper branch switch and a lower branch switch. The upper and lower branch switches are positioned on either (e.g. opposite) side of the switch arm output. The input circuit comprises upper and lower isolating switches that can be selectively operated to respectively isolate the upper and/or lower branches of the switching circuit. The diode bridge arrangement comprises at least one diode bridge arm for each switch arm of the switching circuit, the respective diode bridge arms providing freewheeling paths for the upper and lower branch switches of the respective switch arm to the upper branch of the switching circuit. The diode bridge arm may for instance comprise one or more diodes that allow current to flow to the upper branch (and block current from flowing back to the lower branch).

The upper and lower isolating switches assist in the control, e.g. isolation, of the upper and lower branch switches of the switch arms. By operating the upper and/or lower isolation switches, the respective upper and/or lower branch switches can be controllably isolated. Thus, the inverter topology of the present disclosure provides an improved means for management of short circuit fault conditions such as OSSC faults.

A method according to the present disclosure thus comprises, in response to one or more of the switches within the switching circuit experiencing a short circuit fault, operating at least one of the upper and/or lower isolation switches to manage the fault. It is a benefit of the inverter topology described herein that various different operation modes can be implemented to manage the fault.

For example, in embodiments, a method may comprise opening one or both of the upper and/or lower isolation switches to isolate the fault. By isolating the fault in this way, motor drag torque that might otherwise result from the faulty channel (e.g. in more conventional inverter arrangements) may be reduced, e.g., and in embodiments, eliminated.

Additionally or alternatively, the method may comprise operating the upper and/or lower isolation switches to provide continued useful AC output. For example, when one of the inverter switches fails, the inverter may still be used to produce some useful output by repeatedly switching at least one of the upper and/or lower isolation switches on and off over successive periods to thereby provide the required switching function.

The power inverter of the present disclosure may also, in embodiments, be operated in reverse, e.g. as a generator, e.g. to provide a DC output from the motor. The method may thus comprise operating the upper and/or lower isolation switches to thereby operate the power inverter in a reverse power generation mode in which the power inverter produces DC power at its input that can be extracted accordingly. For example, the operating of the power inverter in a reverse power generation mode may comprise opening the isolation switch corresponding to the faulty upper/lower branch switch, while maintaining the other isolation switch in a closed position. By providing power generation over a faulty channel, which power can then be provided (e.g.) to assist a healthy channel, overall system power losses can be reduced.

The power inverter of the present disclosure may thus be incorporated into systems to improve the system tolerance of short circuit faults. Thus, a motor drive circuit according to the present disclosure comprises a motor and one or more power inverters according to any of the preceding claims. The motor may be a permanent magnet motor, for example.

The motor drive circuit of the present disclosure preferably comprises at least two power inverters, each power inverter associated with a separate power channel of the motor, the separate power channels thereby providing redundancy. As mentioned above, in some operating modes, the inverter enables a faulty motor drive channel to continue to assist any remaining healthy channel(s) in the continued production of motoring and/or generating power.

The Applicants have recognised that in more conventional inverter arrangements where each inverter switch has a parallel freewheeling diode (e.g. as shown in FIG. 2) a failure (e.g. a short circuit) of a switch, or a switch's parallel freewheeling diode, can result in the generation of motor drag by providing unwanted current paths. The upper and lower isolating switches of the power inverter are in embodiments connected between the diode bridge arms' connections to the upper and lower branches and the switch arms to provide the desired freewheeling paths to the upper branch in all situations, e.g. even when fully isolated, thus eliminating motor drag.

The branch switches of the power inverter may be any suitable switches. For example, the switches may comprise IGBT, MOSFET and/or GTO type switches. Some of these switch types, such as GTO switch types, are capable of withstanding a reverse voltage and inhibiting the flow of current in an unwanted direction. Other switch types however may not be suitable for withstanding the reverse voltage.

Thus, each switch arm of the power inverter may further comprise respective diodes connected in series with the upper and lower branch switches, the diodes operable assist the branch switches in inhibiting a flow of current in an unwanted direction.

The topology of the power inverter means that, in embodiments, only a single desaturation protection circuit is required to provide protection for the branch switches against short-circuit current events, e.g. rather than requiring a separate desaturation protection circuit for each switch arm, as may be the case in some more conventional arrangements. Thus, at least one of the upper and lower isolating switches of the power inverter may comprise a desaturation protection circuit, while the switch arms are in embodiments not provided with separate desaturation protection circuits.

The power inverter may be operable to provide any number of AC output phases. In embodiments the power inverter may provide at least two phases of AC output, and the topology may therefore correspondingly comprise at least two switch arms, one for each phase of the AC output. In particular embodiments, the power inverter is configured to provide three phases of AC output, and thus has three respective switch arms, with at least three corresponding diode bridge arms.

Various other arrangements would of course be possible.

BRIEF DESCRIPTION OF DRAWINGS

Various embodiments will now be described, by way of example only, with reference to the drawings.

FIGS. 5a-f show simulated results for a method of OSSC fault isolation according to an embodiment.

FIGS. 6a-f show simulated results for a method of OSSC fault management in a motoring mode according to an embodiment.

FIGS. 7a-f show simulated results for a method of OSSC fault management in a generating mode according to an embodiment.

Like reference numerals are used for like components where appropriate in the Figures.

DETAILED DESCRIPTION

Figure 1:
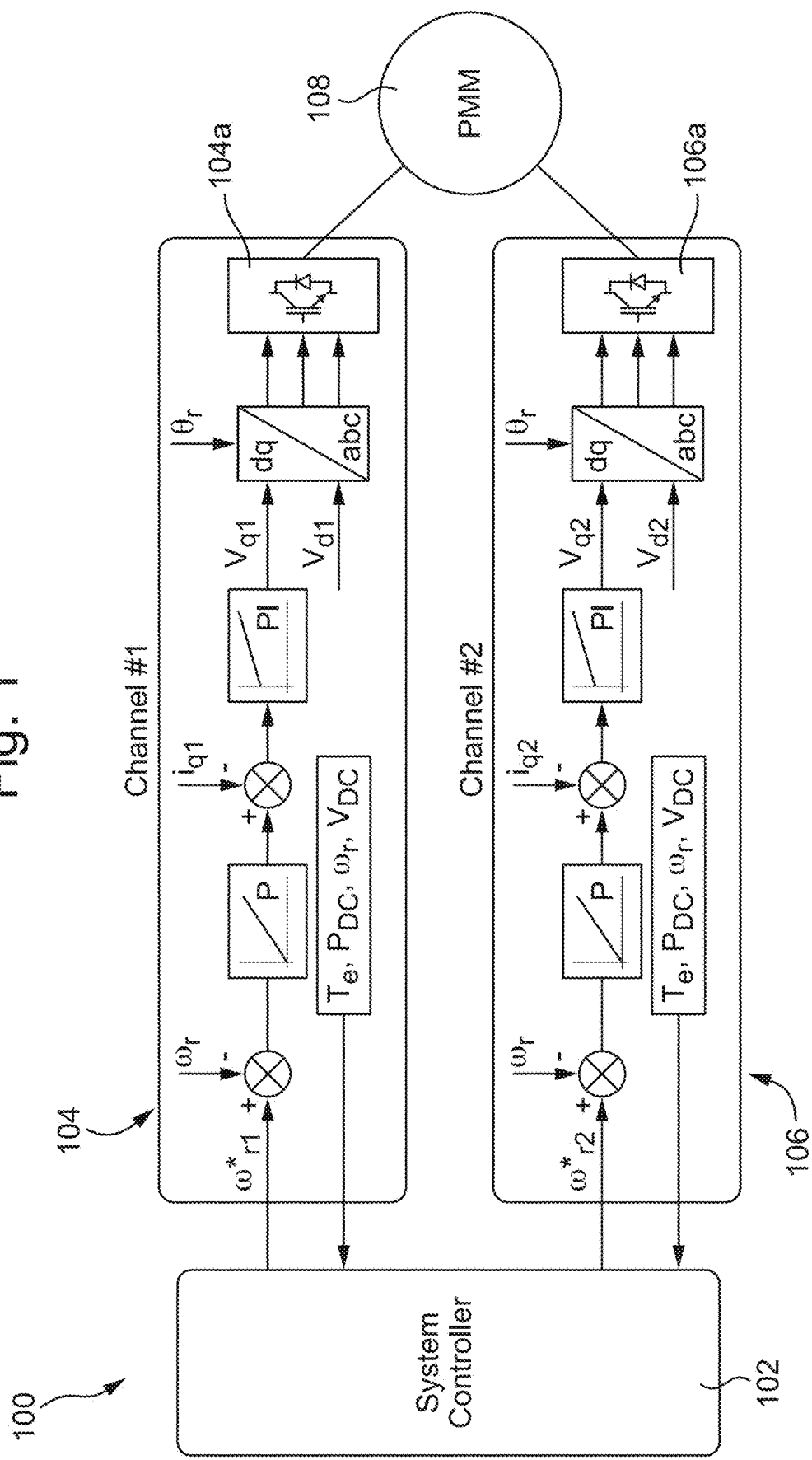
FIG. 1 is a schematic diagram of an example of a duplex permanent magnet motor drive system.

As briefly described above, FIG. 1 shows an example motor drive for a permanent magnetic motor 108. In the system 100 of FIG. 1, the duplex permanent magnet motor comprises two segregated windings, with each winding being driven by a respective, separate channel. The system controller 102 is therefore operably connected to the permanent magnetic motor 108 via two channels 104, 106, each channel comprising a respective inverter circuit 104a, 106a that provides one or more phases of AC output to its respective motor winding. The use of two separate inverters 104a, 106a each corresponding to one of the channels 104, 106 provides redundancy in the system, as the second inverter (e.g. 106a) is able to take over and control the motor torque in the event that the first inverter (e.g. 104a) develops a fault. This duplex arrangement is therefore particularly suitable for safety critical applications such as for driving electric motors within aircrafts, such as for High Lift Systems. However, different numbers of channels and inverters may of course be used, as desired.

Figure 2:
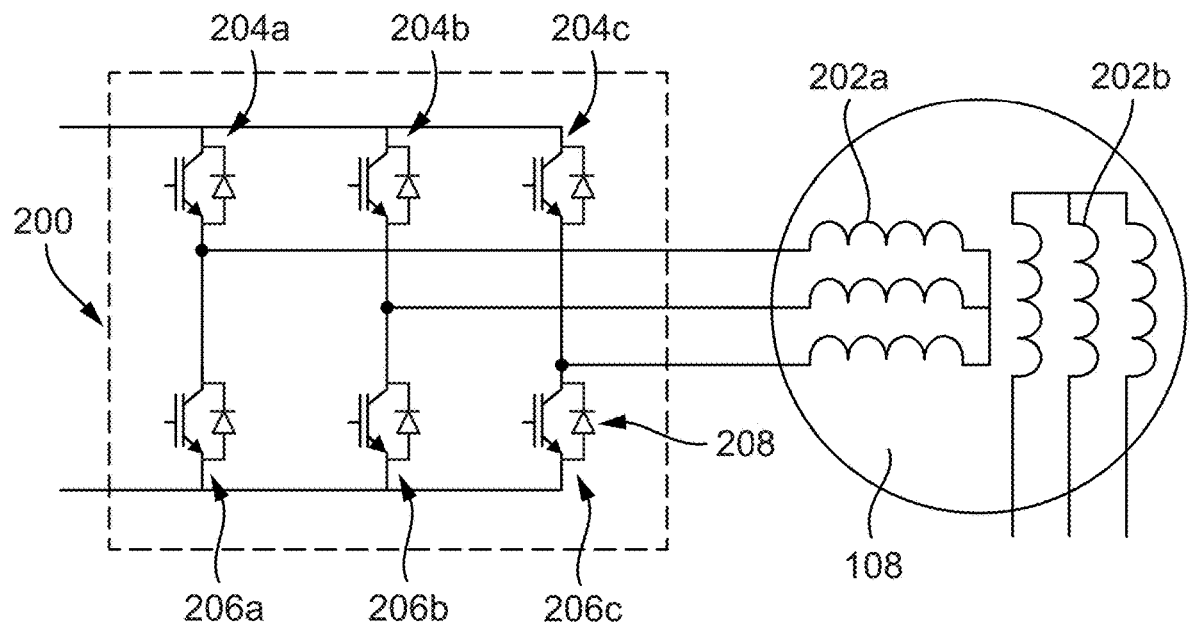
FIG. 2 is a schematic diagram showing an example of an existing two-level three-phase inverter topology.

FIG. 2 shows an example of a more conventional two-level three-phase inverter circuit 200 that could be used for the respective channels of the system 100 of FIG. 1. Thus, as shown in FIG. 2, the inverter output is operably connected to the windings 202a of the first channel which are wound about a permanent magnetic motor 108. Although not shown in FIG. 2, it will be understood that a second equivalent inverter system will be provided for the windings 202b of the second channel.

The inverter circuit 200 in FIG. 2 comprises six switches, including three top switches 204a,b,c and three bottom switches 206a,b,c. Each switch 204/206 is connected in parallel with a respective freewheeling diode 208. Under normal operating conditions, the switches are operable to control the inverter output, e.g. in the normal manner for a switching inverter.

Figure 3:
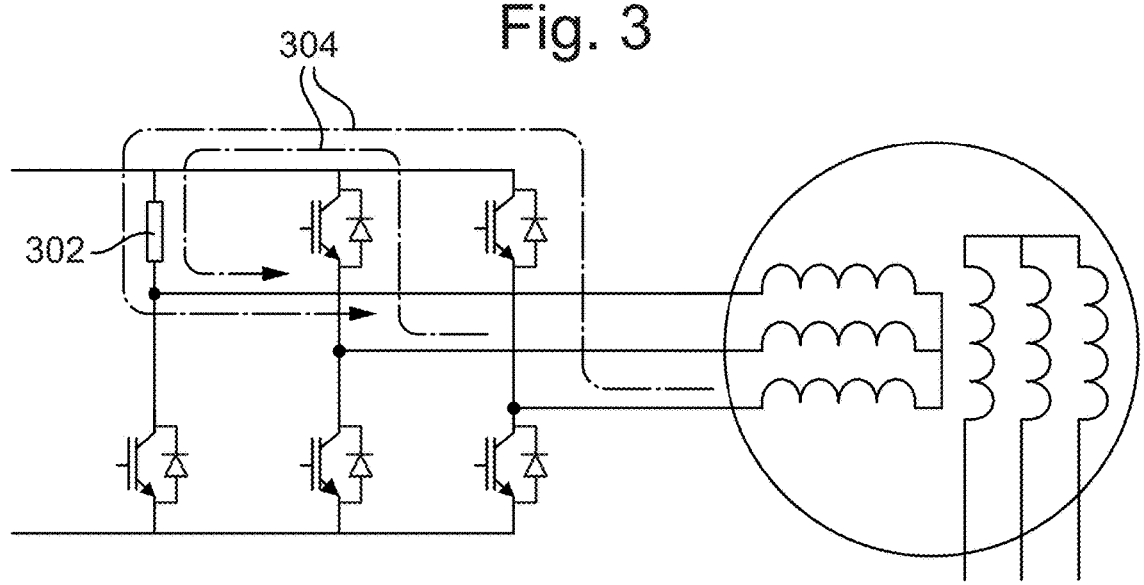
FIG. 3 is a schematic diagram showing an example OSSC fault in the inverter topology of FIG. 2.

FIG. 3 shows schematically the current flow in the inverter circuit 200 of FIG. 2 in the event of an OSSC fault. In this example, a short circuit 302 has occurred at top switch 204a. As a result, currents 304 flow via the short circuited path 302. The resulting waveforms from the flow of currents 304 will produce torque ripples and power losses in the motor, as well as drag torque. The inverter is thus no longer able to control the motor current.

An inverter topology according to an embodiment will now be described that provides a means to effectively manage OSSC and other short circuit fault conditions. As will be described below, in various operation modes the OSSC fault tolerant (OSSCFT) inverter topology of the present embodiment may substantially eliminate motor drag torque and/or allow the channel experiencing the OSSC fault to still produce at least some useful torque in order to assist the healthy channel, thereby allowing a reduction in the overall system size.

Figure 4:
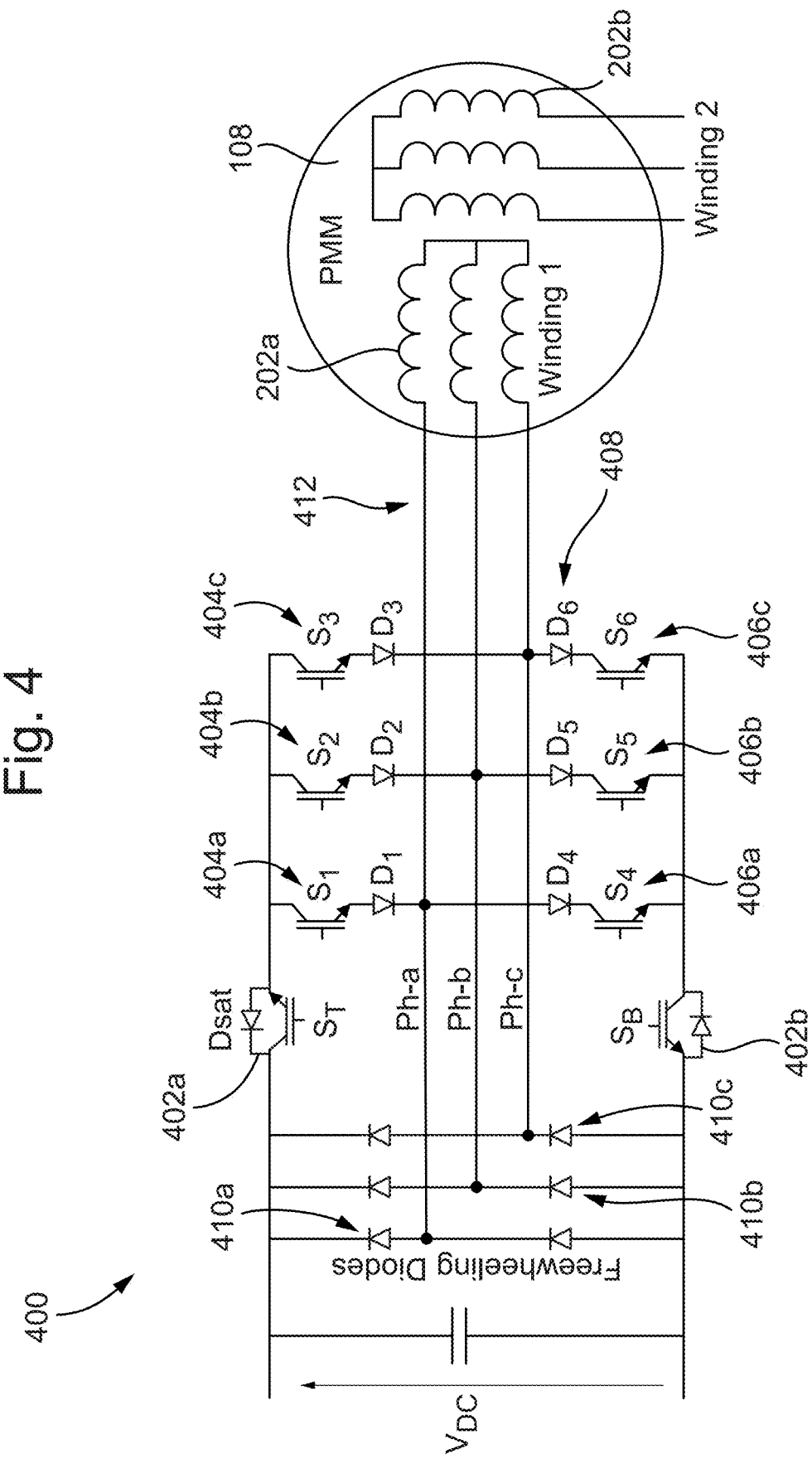
FIG. 4 is a schematic diagram of an OSSC fault tolerance converter topology according to an embodiment.
Figure 5D:
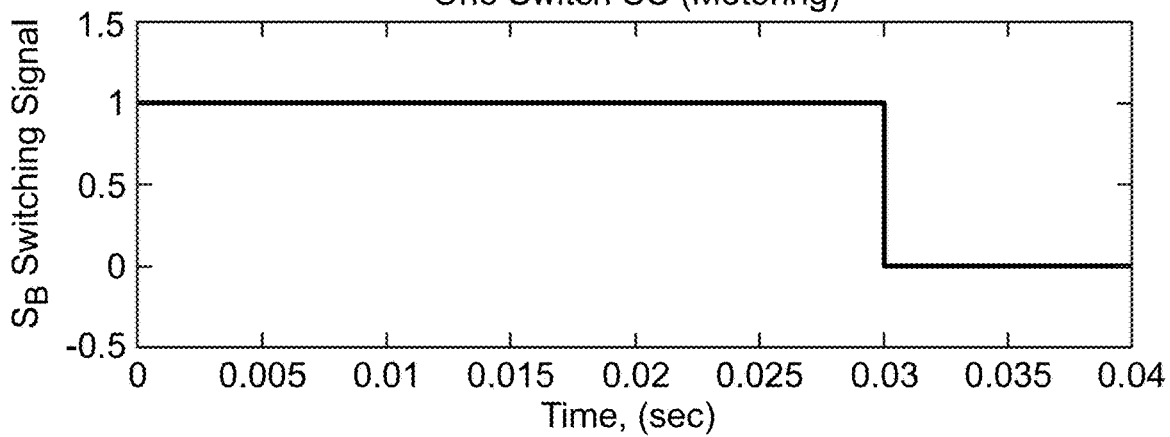
Figure 5E:
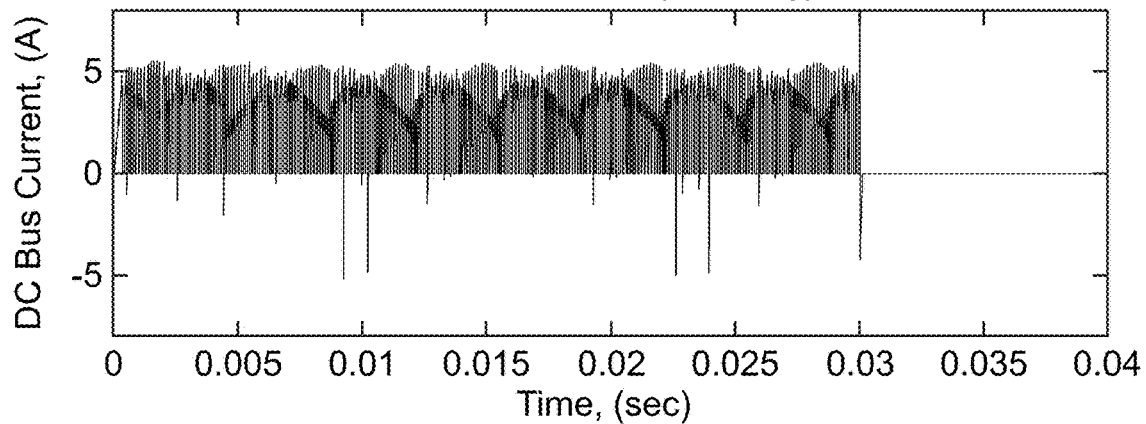
Figure 5F:
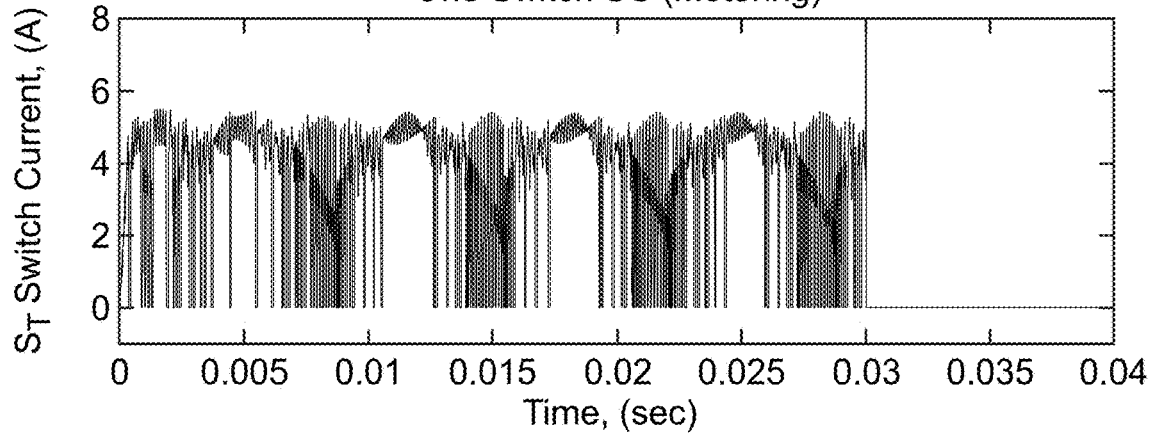

FIG. 4 shows an example of a channel for a permanent magnet motor drive system including a two-level three-phase inverter having an OSSCFT topology in accordance with an embodiment. It will be understood that the permanent magnetic motor drive system may further comprise one or more additional channels, each of which may comprise their own (corresponding) inverter circuits. These additional inverter circuits may each, and in the present embodiment do, have the same topology as inverter 400.

Figure 8:
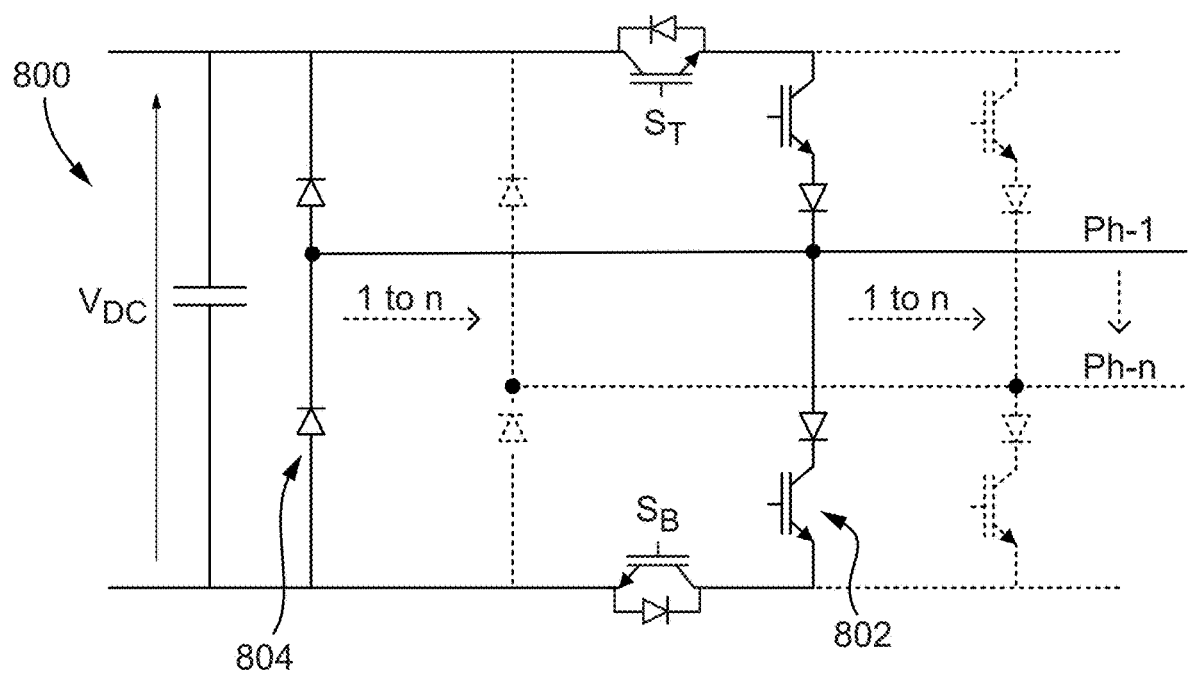
FIG. 8 is a schematic diagram showing an example of a generalised n–phase inverter topology according to an embodiment.

The inverter 400 comprises a switching circuit including three switch arms extending between upper and lower DC buses (generally, upper and lower 'branches') of the switching circuit, each switch arm providing a respective AC output phase. It will be understood that the number of switch arms in the inverter 400 correlates with the number of desired output phases (i.e. three, in this example), and that the inverter may comprise a different number of switch arms if desired, including but not limited to 1, 2, 3, 4 or more switch arms corresponding to respective single-, two-, three-, four-, etc. phase output topologies. A generalised n-phase inverter topology is shown in FIG. 8.

Each switch arm of inverter 400 comprises two switches, including an upper branch switch 404a,b,c and a lower branch switch 406a,b,c. The upper branch 404 and lower branch 406 switches are paired along respective their switch arms on different sides of the respective switch arm output 412. In inverter 400, each switch 404, 406 is paired in series with a reverse current blocking diode 408 to inhibit current flow in an undesired direction. Other arrangements would of course be possible. For example, some unidirectional switches, such as a Gate Turn-Off Thyristor (GTO) type switch, are operable to withstand a sufficient reverse voltage. As such, diodes 408 are not strictly essential.

The switches in the switching circuit may be designed in any suitable and desired way. For instance, in embodiments, the switches 404, 406 may comprise IGBT, MOSFET or GTO type switches. However, other arrangements would of course be possible. The switches 404, 406 are, in normal operation, controlled to generate the desired AC output phases. Thus, in normal (healthy) operation of the inverter, a DC voltage is applied across the upper and lower branches and the switching circuit is operated to convert the input DC voltage to one or more AC phases, e.g. in the normal manner for a switching inverter.

Thus, in normal (healthy) operation, the inverter according to the FIG. 4 embodiment acts similarly to the more conventional inverter that is shown in FIG. 2. However, and as will be explained further below, the inverter according to the present operation is able to better handle short circuit faults such as OSSC faults.

To facilitate this, in addition to the various switches 404, 406 within the switching circuit, the inverter 400 according to the present embodiment further comprises upper and lower isolation switches, 402a,b that are selectively operable to respectively isolate the upper and lower branches of the switching circuit. As such, the upper branch isolation switch 402a is operable to isolate all of the upper branch switches 404a,b,c for the switch arms, and the lower branch isolation switch 402b is correspondingly operable to isolate all of the lower branch switches 406a,b,c. The isolation switches 402a,b in embodiments are thus configured to act as Solid State Circuit Breakers. In embodiments, the isolation switches 402a,b are current overrated with wide safe operating area compared to the switches 404,406 of the switching circuit.

A controller for the system that the inverter is part of is thus operable to detect a short circuit of either the switch or the switch and the associate reverse blocking diode, such as OSSC faults, and in response to this, control the isolation switches 402a,b appropriately. Various examples of the OSSC fault management will be described further below.

In order to provide freewheeling paths to the upper branch (DC bus), the inverter further comprises, for each switch arm (phase), a respective diode bridge arm, such that the freewheeling diode bridge arms collectively form a freewheeling diode bridge. Thus, as shown in FIG. 4, each winding phase of the motor is operably connected to the inverter 400 via a respective switch arm and a respective freewheeling diode bridge arm 410a,b,c. In particular, in FIG. 4, the upper and lower branch switches of each switch arm (e.g. switch pairs 404a and 406a, 404b and 406b, etc.) share a corresponding freewheeling diode bridge arm (e.g. 410a, 410b, etc.). Thus, FIG. 4 shows a three-phase diode bridge arrangement, with each output phase (switch arm) having its own diode bridge arm providing a respective freewheeling path to the upper branch. Note that the diode bridge arms are connected to the upper branch upstream of the isolation switches so that when the isolation switches are open, the freewheeling current cannot flow back into the motor windings. Although in FIG. 4 each switch arm has a single corresponding diode bridge arm this is not strictly necessary and, for instance, each of the switches 404a, 404b, 406a, etc. could have its own diode bridge arm, so long as these provide suitable freewheeling paths to the upper branch for each of the switches.

That is, however the freewheeling paths are arranged in the present embodiment, all of the switches should have a freewheeling path (directly) to the upper branch, and upstream of the isolation switch. This helps to ensure that in the event of switch failure the freewheeling current can be handled appropriately, without generating motor drag. This is contrast to the more conventional arrangement shown in FIG. 2 where each switch has its own parallel freewheeling diode, which can lead to the issues illustrated in FIG. 3.

As shown in FIG. 4, the upper branch isolation switch 402a may be associated with a desaturation protection (Dsat) circuit. Alternatively/additionally, this could be provided on the lower branch isolation switch 402b. However, it is a benefit of the present embodiment that only a single desaturation protection circuit is required in order to be able detect the shoot-through current, in comparison to at least three such circuits (e.g. on at least one switch of each switch arm) that may be required in a topology without isolation switches 402a,b, such as that shown in FIG. 2. Thus, in the present embodiment, the switches 404,406 within the switching circuit can be protected only by the desaturation protection circuit associated with the isolation switch, and do not require their own, respective desaturation protection (and so in embodiments these are not provided).

The two-level three-phase inverter topology according to the present embodiment may thus generally be comprised of the following components:

Six discrete switches, ($s_1$, $s_2$, $s_3$, $s_4$, $s_5$, $s_6$). These may be unidirectional switches. As mentioned above, the switches may be based on either IGBT, MOSFET or GTO technologies. Other examples would however be possible.

Optionally six reverse blocking discrete diodes, ($D_1$, $D_2$, $D_3$, $D_4$, $D_5$, $D_6$) connected in series with the above-mentioned switches.

Two DC bus isolation switches, $S_T$ and $S_B$, acting as Solid State Circuit Breaker (SSCB).

Respective diode bridge arms, for each switch arm (for each phase), that provide the freewheeling paths to the upper branch of the inverter.

A desaturation (Dsat) protection circuit associated with one of the isolation switches and arranged for detecting the shoot through current.

Under normal (active) operation conditions, the isolation switches 402a,b may generally be maintained in an always on state and as a result the inverter 400 may operate substantially in line with conventional two-level voltage source inverters.

However, in the event of a failure of one or more of the upper branch switches 404a,b,c and/or the associated reverse blocking diode resulting in either a unidirectional or bidirectional short circuit fault across the respective switch (e.g. an OSSC fault), the fault may be isolated and/or managed using the upper branch isolation switch 402a. Thus, in case, one of the upper branch switches fails, it may be sufficient to switch off the upper branch isolation switch to isolate and manage the fault. Similarly, a fault resulting from a failure of one or more of the lower branch switches 406a,b,c and/or the associated reverse blocking diode may be isolated and/or managed using the lower branch isolation switch 402b.

Moreover, in the event of a short circuit fault of any of switches 404, 406 and/or associated reverse blocking diodes (such as an OSSC fault), the presence of the isolation switches means that the OSSCFT inverter 400 according to the present embodiment is also still able to produce useful output for (assisting) motoring by controlling the remaining (operational) switches and isolation switches 402a,b. That is to say that, in contrast to existing motor inverter topologies, a faulty OSSCFT inverter 400 can be operated such that it continues producing useful motoring torque, and as a result the overall size of the motor drive system can be reduced. For instance, the isolation switches can be switched on and off in order to provide some useful AC output.

Indeed, a benefit of the present embodiment is that inverter can be operated in various different fault management modes using the isolation switches. That is, the novel topology shown in FIG. 4 allows for various novel operation modes that can provide improved performance in the event of an OSSC fault.

Simulated results of various operating modes for the inverter 400 under an OSSC fault condition are discussed below. It will be understood that these operation modes are provided as illustrative examples. The following examples are provided to demonstrate some of the advantages of the OSSCFT inverter topology of the present embodiment. In each of these simulations, one of the upper branch switches (e.g. 404a) associated with the upper isolation switch $S_T$ (e.g. 402a) develops or has developed an OSSC fault.

FIGS. 5a-f show simulated results of operating the OSSCFT inverter topology in an isolation mode. Prior to 0.03 seconds, the motor is operating in a motoring mode at a constant speed. As such, the phase current waveforms are sinusoidal and the motor power Pe is constant.

At time 0.03 seconds the OSSC fault is detected in a switch (e.g. 404a). In response, the top and bottom isolation switch (e.g. 402a,b) are opened, as shown in FIGS. 5c and d. Alternatively, in other operating modes only one of the top and bottom isolation switches may be opened. Any remaining operational switch arm switches (e.g. switches 404b,c and 406a,b,c) may also be switched off at this same time. After the isolation switches are opened, the switching circuit is isolated, and the transient motor phase currents freewheel through the diode bridge arms to the upper branch (DC bus) without causing any overvoltage to the switch arm switches. The motor phase currents, as well as the currents on the upper branch (DC bus) and in the upper branch isolation switch then decay quickly to zero, as shown in FIGS. 5a, b, e and f. The faulty channel therefore does not result in motor drag torque. The channel is therefore isolated and the control can be switched to the other (healthy) channel appropriately without the healthy channel having to compensate for motor drag due to the faulty channel.

As discussed above, in addition to allowing a channel to isolated, the OSSFT inverter topology of the present embodiment also enables the continued production of useful motoring power, even under OSSC fault conditions. For instance, even though one of the switches (and/or the associated reverse blocking diode) has short circuited, and so cannot be controlled to produce motoring power, some useful AC output can nonetheless be generated by appropriate switching of the isolation switches and the remaining inverter switches. That is, in the event of a fault within the switching circuit, that means the switching circuit switches cannot be controlled to produce AC output, the isolation switches can be operated with the remaining switches in an analogous manner in order to provide an AC output.

Figure 6B:
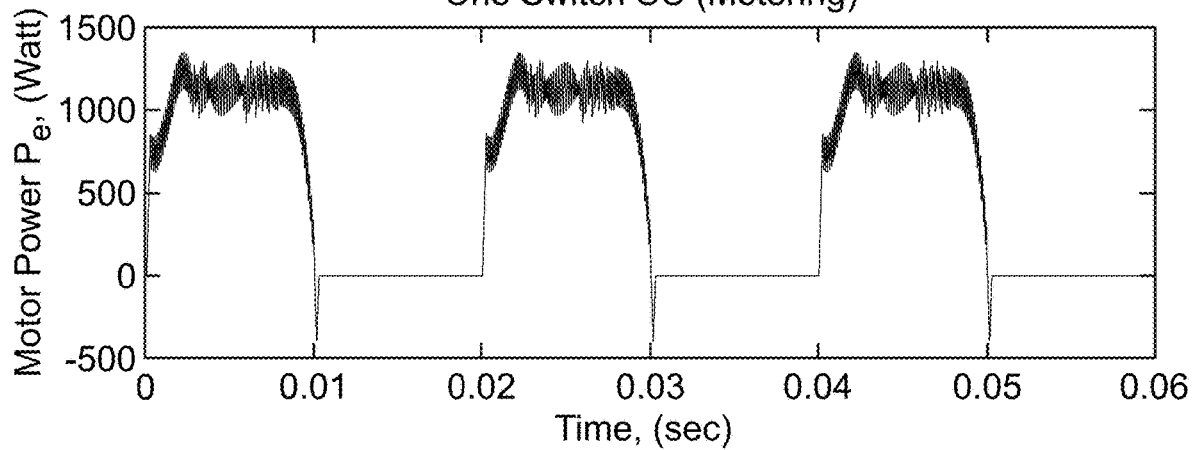
Figure 6C:
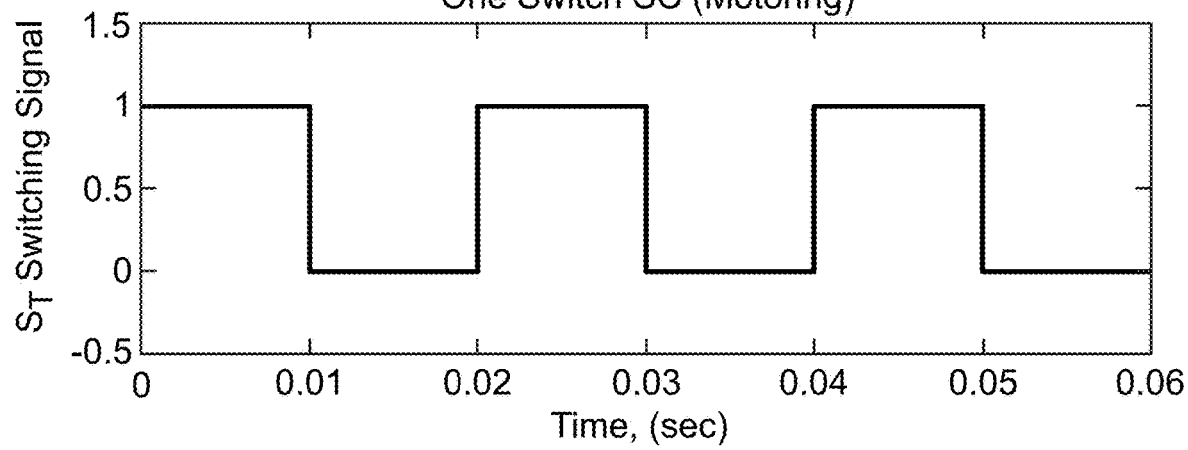
Figure 6D:
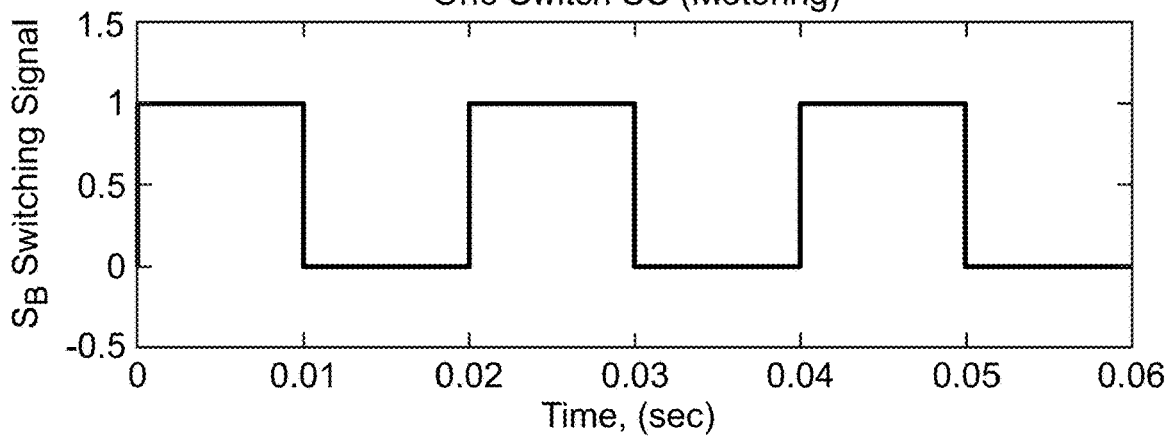
Figure 6E:
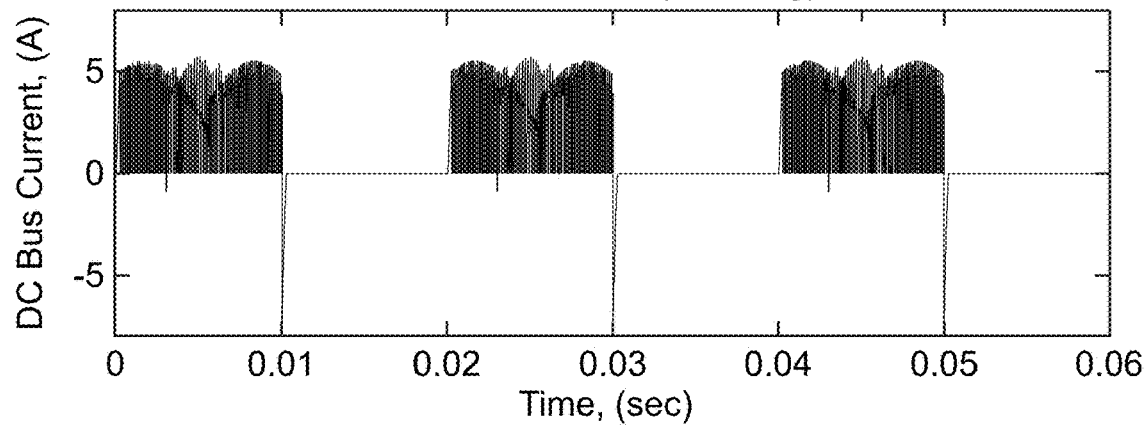
Figure 6F:
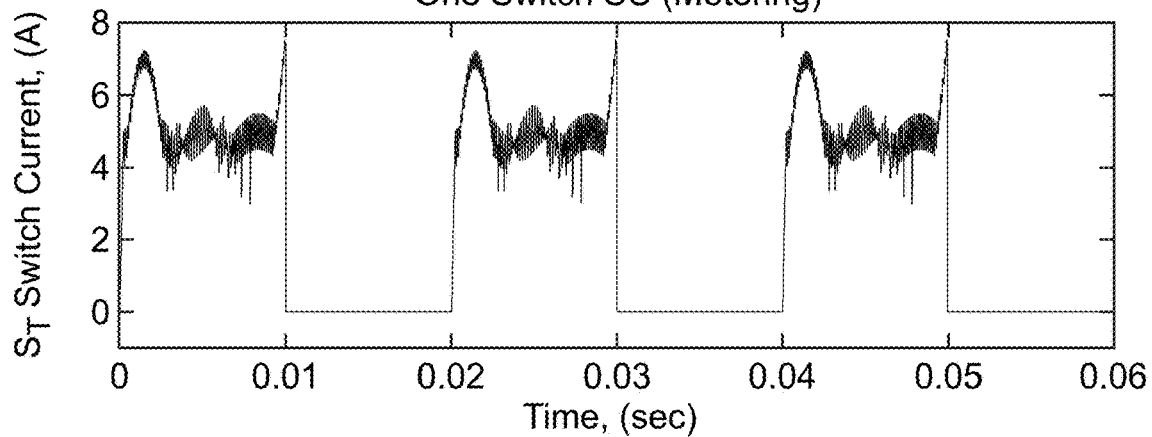

FIGS. 6a-f show the simulated results of operating the OSSCFT inverter topology in one such motoring assistance fault management operating mode. In this example, both of the top and bottom isolation switches are simultaneously switched on and off for successive 0.01 second periods, as shown in FIGS. 6c and d.

In this operating mode, the OSSCFT inverter topology thus enables a degree of control of the motor current and thereby assist in the production of motoring power via the extraction of positive torque during the periods in which the isolation switches are switched on, as shown in FIG. 6b.

During the periods in which the isolation switches are switched off, the motor current freewheels to the DC bus and decays to zero relatively quickly, as shown in FIGS. 6a and e.

In some embodiments, the switch periods may be equal to 180° of the fundamental motor period, such that the isolation switches are switched on for 180° of the fundamental motor period and switched off for the other 180° of the fundamental motor period. This alternating 180° operating sequence therefore produces motoring power pulses with 50% duty cycle and with a repeating frequency equal to the fundamental frequency of the motor.

In any case, the OSSCFT inverter topology enables a faulty channel to continue producing at least some useful motoring torque to assist any remaining healthy channels, and/or enable at least partial operation of the motor.

The expected switching stress of this method may be reduced by operating the isolation switches at a frequency below the fundamental frequency of the motor. For example, for a motor designed for a fundamental frequency of 900 Hz, the switching frequency of the isolation switches may be less than 900 Hz.

A further example of a fault management operation mode is shown in FIGS. 7a-f. In this example, the OSSCFT inverter topology is operating in reverse as a converter under a generation assistance fault management operating mode, to provide high quality (i.e. constant) generating power to assist the healthy channel. For instance, it will be understood that inverter 400 may also be operated in reverse as a converter to generate power and/or torque, i.e. in a generating mode of operation.

Figure 7D:
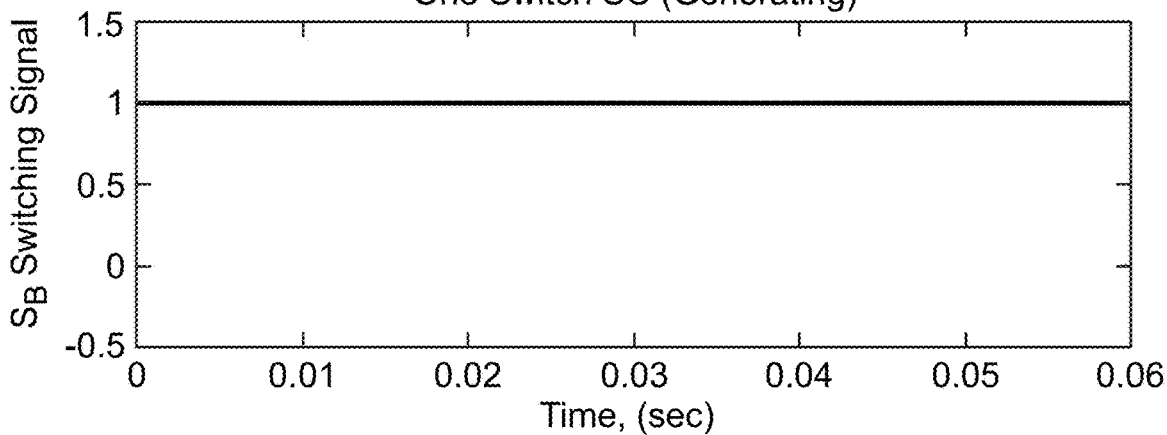
Figure 7E:
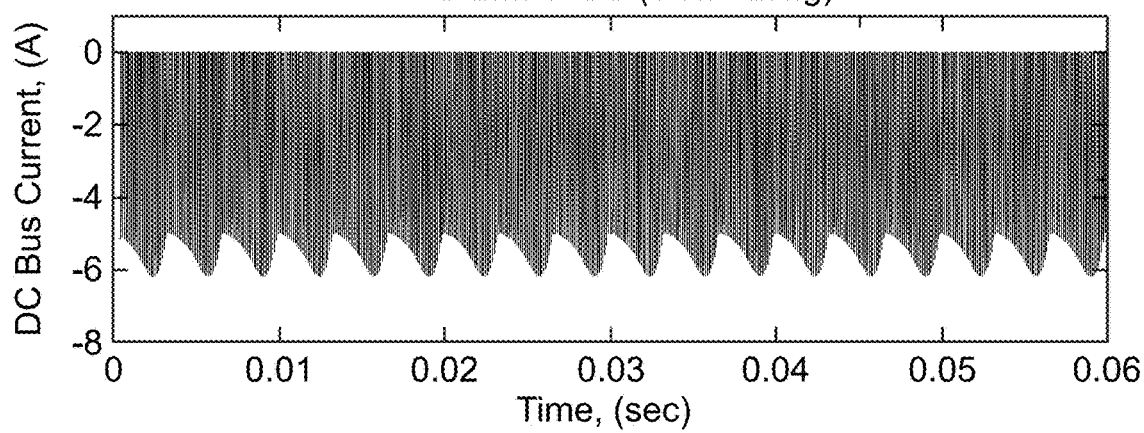
Figure 7F:
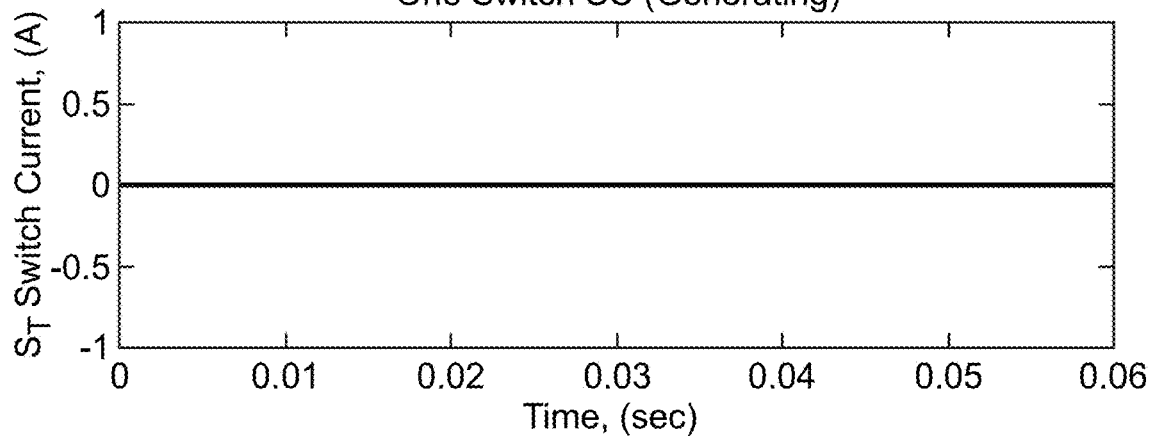

As shown in FIGS. 7c and 7d, in this operating mode the upper isolation switch ST corresponding to the faulty switch (e.g. switch arm switch 404a) is switched off while the lower isolation switch SB remains switched on. The remaining operational switch arm switches can then be switched on and off in accordance with current controller command signals to thereby produce a constant generating power as shown in FIGS. 7a and 7b.

Under these conditions, the OSSCFT inverter topology may be operated to control the motor current to produce constant generating power for the entire 360° of the fundamental motor period (as shown by FIGS. 7b and e).

Hence, even after developing an OSSC fault, the OSSCFT inverter topology can still be operated as a converter to deliver high quality generating power, and therefore assist any remaining healthy channels with the generation of power. This operational mode assists in reducing overall system power losses and thermal stresses, and thereby may also increase the operational lifetime of the system.

Thus, the inverter topology according to the present embodiment provides full management and isolation capability to the most critical OSSC fault condition. It also provides full freewheeling functionality to the motor current and hence prevents overvoltage during switching of converter switches in normal and faulty operating conditions. Furthermore, this is achieved by the addition of only two additional switches and a diode bridge in comparison to a more conventional two-level converter topology. The present embodiment thus provides various benefits compared to more conventional approaches.

FIG. 8 shows a schematic of a generalised n-phase inverter topology 800 according to an embodiment. Inverter circuit 800 comprises n switch arms 802 and n corresponding diode bridge arms 804 collectively forming an n-phase freewheeling diode bridge arrangement.

The inverter topology according to the present embodiment is particularly suitable for improving reliability of PMM drive systems. For instance, in embodiments, the following advantages may be provided:

No drag torque under OSSC fault condition and hence no need to oversize the motor drive system; Capability of providing assistance motoring power/torque while under OSSC fault; Capability of providing high performance and high quality generating power/torque and sharing the load power while under OSSC fault condition; Simple shoot through protection, which can be achieved by deploying only one Dsat circuit to the gate drive of either $S_T$ or $S_B$; and Potential of reducing the size of motor drive system for fault tolerant application.

While the above examples have been provided primarily with reference to example three-phase inverter topologies, embodiments of the invention extends to other configurations of inverter topologies, including but not limited to single-phase topologies (such as 1, 2, 3, 4, etc.-phase topologies) and multiple three-phase topologies (such as 3, 6, 9, etc.-phase topologies). In each case, it will be understood that the number of components such as switches and freewheeling diodes may be varied accordingly.

It will be further understood that while the above embodiments of the present invention have been described with reference to a single level inverter that provides power directly to the windings of a motor, the inverter may instead be incorporated into a multi-level system and instead be configured to receive and/or provide AC output current to another or other inverter(s).

Additionally, while the above examples have been provided primarily with reference to example dual channel systems, embodiments of the invention further extend to permanent magnet motor drive systems with different numbers of inverters and/or channels, including but not limited to single channel, dual channel, triple channel, etc. motor drive systems.

Variations on the examples described above fall within the scope of the claims.

The invention claimed is:
1. A power inverter for converting a DC input to one or more phases of AC output, the power inverter comprising:
an upper branch;
a lower branch;
an active switching circuit comprising a respective switch arm for each phase of the AC output, each switch arm extending between the upper and lower branches and comprising an upper branch switch and a lower branch switch, wherein the upper and lower branch switches are positioned on either side of the switch arm output;
an input circuit comprising upper and lower isolating switches that can be selectively operated to respectively isolate the upper and/or lower branch switches of the active switching circuit; and
a respective one or more diode bridge arm for each switch arm of the switching circuit, the one or more diode bridge arm for a switch arm providing freewheeling paths to the upper branch for the respective upper and lower branch switches of the switch arm;
wherein the upper and lower isolating switches are connected between the diode bridge arms' connections to the upper and lower branches and the active switching circuit;
wherein the active switching circuit is configured to in response, to one or more of the switches within the switching circuit experiencing a short circuit fault, operate at least one of the upper and/or lower isolation switches to manage the fault;

wherein operating at least one of the upper and/or lower isolation switches to manage the fault comprises operating the upper and/or lower isolation switches to provide AC output; wherein operating the upper and/or lower isolation switches to provide AC output comprises repeatedly switching at least one of the upper and/or lower isolation switches on and off over successive periods.

2. The power inverter of claim 1, wherein each switch arm further comprises respective diodes connected in series with the upper and lower branch switches.

3. The power inverter of claim 1, wherein at least one of the upper and lower isolating switches comprises a desaturation protection circuit.

4. The power inverter of claim 3, wherein the switch arms are not provided with separate desaturation protection circuits.

5. The power inverter of claim 1, wherein the power inverter provides at least two phases of AC output.

6. The power inverter of claim 5, wherein the power inverter provides three phases of AC output.

7. A motor drive circuit comprising:
a motor; and
one or more power inverters according to claim 1.

8. The motor drive circuit of claim 7, comprising at least two power inverters, each power inverter associated with a separate power channel of the motor, the separate power channels providing redundancy.

9. The motor drive circuit of claim 7, wherein the motor is a permanent magnet motor.

10. A method of monitoring faults within a system comprising a power inverter as claimed in claim 1, the method comprising:
in response to one or more of the switches within the switching circuit experiencing a short circuit fault:
operating at least one of the upper and/or lower isolation switches to manage the fault.

11. A method of monitoring faults within a system comprising a power inverter, the power inverter for converting a DC input to one or more phases of AC output, the power inverter comprising:
an upper branch;
a lower branch
an active switching circuit comprising a respective switch arm for each phase of the AC output, each switch arm extending between the upper and lower branches and comprising an upper branch switch and a lower branch switch, wherein the upper and lower branch switches are positioned on either side of the switch arm output;
an input circuit comprising upper and lower isolating switches that can be selectively operated to respectively isolate the upper and/or lower branch switches of the active switching circuit; and
a respective one or more diode bridge arm for each switch arm of the switching circuit, the one or more diode bridge arm for a switch arm providing freewheeling paths to the upper branch for the respective upper and lower branch switches of the switch arm;
wherein the upper and lower isolating switches are connected between the diode bridge arms' connections to the upper and lower branches and the active switching circuit;
the method comprising:
in response to one or more of the switches within the switching circuit experiencing a short circuit fault:
operating at least one of the upper and/or lower isolation switches to manage the fault;
wherein operating at least one of the upper and/or lower isolation switches to manage the fault comprises operating the power inverter in a reverse power generation mode in which the power inverter produces DC power at its input.

* * * * *